United States Patent [19]

Takekawa et al.

[11] Patent Number: 4,930,698
[45] Date of Patent: Jun. 5, 1990

[54] CONTROL APPARATUS FOR AUTOMOBILE AIR-CONDITIONERS

[75] Inventors: Yoriyuki Takekawa; Hidekazu Oshizawa, both of Higashi, Japan

[73] Assignee: Diesel Kiki Co., Ltd., Tokyo, Japan

[21] Appl. No.: 361,862

[22] Filed: Jun. 6, 1989

[51] Int. Cl.$^5$ ............................................. B60H 3/00
[52] U.S. Cl. .................... 236/49.3; 165/43; 236/13; 236/91 F
[58] Field of Search ............ 236/13, 49.3, 91 F; 98/2.01; 165/43

[56] References Cited

U.S. PATENT DOCUMENTS

| 4,382,463 | 5/1983 | Ikebukuro | 165/43 X |
| 4,586,652 | 5/1980 | Sakurai | 236/13 |
| 4,744,511 | 5/1988 | Kakehi et al. | 236/13 |

FOREIGN PATENT DOCUMENTS

0077215  5/1982  Japan ........................... 236/13

Primary Examiner—William E. Wayner
Attorney, Agent, or Firm—Wenderoth, Lind & Ponack

[57] ABSTRACT

A control apparatus for an automobile air-conditioner so constructed as to calculate a target discharge air temperature based on a control parameter determined by the vehicle compartment temperature and the outside air temperature, then control a component of the air-conditioner according to a result of the calculation. The control parameter is obtained by interpolation of experimentally determined reference data with the present vehicle compartment temperature and the present outside air temperature. With this arrangement, a fine temperature control can be achieved.

2 Claims, 8 Drawing Sheets

CONTROL APPARATUS FOR AUTOMOBILE AIR-CONDITIONERS

BACKGROUND OF THE INVENTION

1. Field of the Invention

The present invention relates generally to a so-called "auto-aircon", i.e. an air conditioner for automobiles, and more particularly to a control apparatus for producing control data based on various control factors for the control of components of the automobile air-conditioner.

2. Description of the Prior Art

Figure 7:
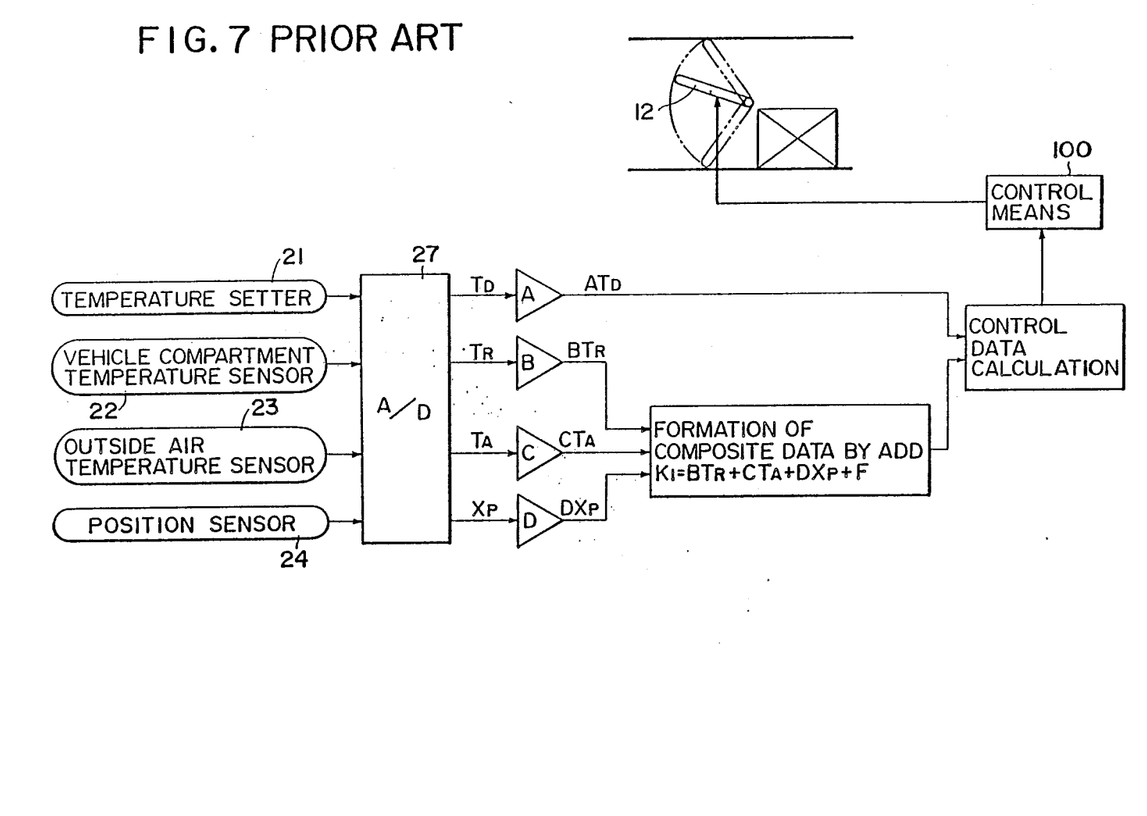
FIG. 7 is a diagrammatical view illustrative of the construction of a conventional control apparatus.

A conventional system for controlling an air-mix door of an automobile air-conditioner is known as disclosed, for, example, in Japanese Patent Publication No. 59-39334. The known control system includes, as reillustrated here in FIG. 7 of the accompanying drawings, a temperature setter 21 for setting a desired temperature $T_D$, a vehicle compartment temperature sensor 22 for detecting the temperature $T_R$ in a vehicle compartment, an outside air temperature sensor 23 for detecting the temperature $T_A$ of air outside the vehicle compartment, and a position sensor 24 for detecting the position $X_P$ of an air-mix door 12. Pieces of data detected by the respective sensors 21-24 are inputted, as control factors, into an A/D converter 27 which in turn converts the inputted analog signals into digital signals $T_D$, $T_R$, $T_A$ and $X_P$. Then, predetermined gains A, B, C and D are added to the respective digital signals $T_D$, $T_R$, $T_A$ and $X_P$ to thereby obtain $A \cdot T_D$, $B \cdot T_R$, $C \cdot T_A$ and $D \cdot X_P$. The thus obtained $B \cdot T_R$, $C \cdot T_A$ and $D \cdot X_P$ are added together to obtain a composite parameter K1 according to the following equation.

$$K1 = B \cdot T_R + C \cdot T_A + D \cdot X_P + F$$

where F is a correction coefficient. Thereafter, the composite parameter K1 and the $A \cdot T_D$ are used to calculate control data for controlling the operation of the air-mix door 12. The control data is supplied to a control unit or means 100 which control the position of the air-mix door 12 according to the control data.

Figure 8:
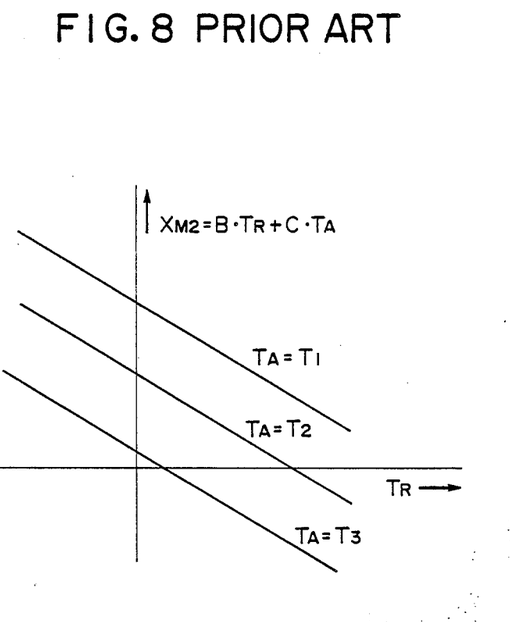
FIG. 8 is a graphic representation of performance curves of composite parameters used in the conventional control apparatus.

If the first and second terms of the right member of the above-mentioned equation is substituted by $X_{M2}$, then $X_{M2}$ is indicated by the following equation.

$$X_{M2} = B \cdot T_R + C \cdot T_A$$

When this equation is indicated by a graph whose Y-axis and X-axis are taken with respect to $X_{M2}$ and $T_R$, respectively, then it is represented by a group of straight lines having a constant gradient B and different intercepts varying with $T_A$, as shown in FIG. 8.

However, an experiment uncovered the fact that optimum composite parameters $X_{M2}$ obtained based on $T_R$ and $T_A$ on the basis of the bodily sensation of an occupant are not indicated by a group of straight lines. This means that the control data obtained by the first-mentioned equation is incapable of realizing a fine control of the air-conditioner needed for providing a sense of comfort for the occupant which varies with various temperature conditions of air inside and outside the vehicle compartment.

With the foregoing drawbacks in view, it may be proposed a control system in which various values for $X_{M2}$ are experimentally obtained by all of the possible values of $T_R$ and $T_A$ and the thus-obtained $X_{M2}$ values are stored as map data in a memory device; when a value of $T_R$ and a value of $T_A$ are inputted, then a corresponding $X_{M2}$ value is read out from the memory device for controlling operation of the air-conditioner. This control system, however, requires a large number of groups of map data and hence a great memory capacity. If the number of groups of map data were reduced for saving the memory capacity, a corresponding reduction of control accuracy would result.

SUMMARY OF THE INVENTION

With the foregoing difficulties in view, it is therefore an object of the present invention to provide a control apparatus for an automobile air-conditioner, which is capable of accurately producing optimum control data based on a least number of sets of map data for controlling the operation of the air-conditioner in conformity with the physical sensation of an occupant and is also capable of achieving a fine temperature control of the vehicle compartment.

According to a first aspect of the present invention, there is provided an apparatus for controlling an automobile air-conditioner, comprising: a temperature setter for setting a temperature; a vehicle compartment temperature sensor for detecting a temperature in a vehicle compartment; an outside air temperature sensor for detecting a temperature of air outside the vehicle compartment; control means for controlling operation of a component of the air-conditioner based on calculated control data; reference composite parameter memory means for storing composite parameters experimentally obtained with respect to a plurality of representative vehicle compartment temperatures and a plurality of representative outside air temperatures; composite parameter calculation means for calculating composite parameters corresponding to output values from said vehicle compartment temperature sensor and said outside air temperature sensor by interpolating the composite parameters stored in said reference composite parameter memory means based on the output values from said sensors; target discharge air temperature calculation means for calculating a desired temperature of discharge air based on a result of calculation by said composite parameter calculation means and an output value from said temperature setter; and control data calculation means for calculating control data for controlling the component of the air-conditioner, based on a result of calculation by said target discharge air calculation means.

According to a second aspect of the present invention, there is provided an apparatus for controlling an automobile air-conditioner, comprising: a temperature setter for setting a temperature; a vehicle compartment temperature sensor for detecting a temperature in a vehicle compartment; an outside air temperature sensor for detecting a temperature of air outside the vehicle compartment; control means for controlling operation of a component of the air-conditioner based on calculated control data; reference composite parameter memory means for storing a plurality of sets of data each composed of composite parameters experimentally obtained with respect to one of a plurality of outside temperatures when the vehicle compartment temperature is varied while each outside temperature is kept constant; selection means for selecting a set of data of the composite parameters from said reference composite parameter memory means according to an output value from said outside air temperature sensor; composite parameter calculation means for calculating a composite parameter corresponding to an output value from said vehicle compartment temperature sensor by interpolating the thus-selected set of data of the composite parameters based on the output value from said vehicle compartment temperature sensor; target discharge air temperature calculation means for calculating a desired temperature of discharge air based on a result of calculation by said composite parameter calculation means and an output value of said temperature setter; and control data calculation means for calculating control data for controlling the component of the air-conditioner, based on a result of calculation by said target discharge air calculation means.

Since composite parameters which correspond to output values from the vehicle compartment temperature sensor and the outside air temperature sensor are obtained by interpolating the experimentally obtained composite parameters stored in the reference composite parameter memory means, the composite parameters obtained with respect to any given values of the vehicle compartment temperature and the outside air temperature are equal to or approximate to the experimentally obtained composite parameters even when a number of map data used is relatively small. As a result, it is possible to obtain an optimum value of the desired discharge air temperature with accuracy which enables formation of control data to realize a fine temperature control corresponding to the bodily or physical sensation of an occupant.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described herein below in greater detail with reference to certain preferred embodiments shown in the accompanying drawings.

Figure 1:
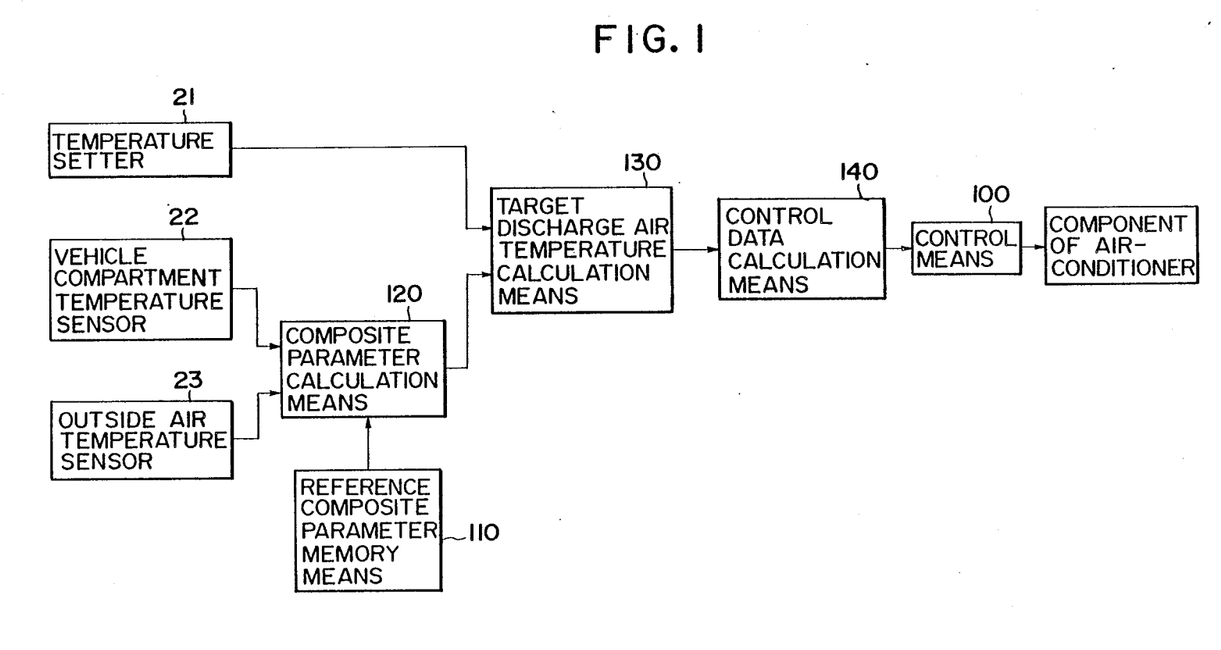
FIG. 1 is a block diagram showing the general construction of a control apparatus for an automobile air-conditioner according to a first embodiment of the present invention.

As shown in FIG. 1, a control apparatus for an automobile air-conditioner according to a first embodiment of the present invention generally includes a temperature setter 21 for setting a temperature, a vehicle compartment temperature sensor 22 for detecting a temperature in a vehicle compartment, an outside air temperature sensor 23 for detecting a temperature of air outside the vehicle compartment, control means 100 for controlling operation of a component of the air-conditioner based on calculated control data, reference composite parameter memory means 110 for storing composite parameters experimentally obtained with respect to a plurality of representative vehicle compartment temperatures and a plurality of representative outside air temperatures, composite parameter calculation means 120 for calculating composite parameters corresponding to output values from the vehicle compartment temperature sensor 22 and the outside air temperature sensor 23 by interpolating the composite parameters stored in the reference composite parameter memory means 110 based on the output values from the sensors 22, 23, target discharge air temperature calculation means 130 for calculating a desired temperature of discharge air based on a result of calculation by the composite parameter calculation means 120 and an output value from the temperature setter 21, and control data calculation means 140 for calculating control data for controlling the component of the air-conditioner, based on a result of calculation by the target discharge air calculation means 130.

Figure 2:
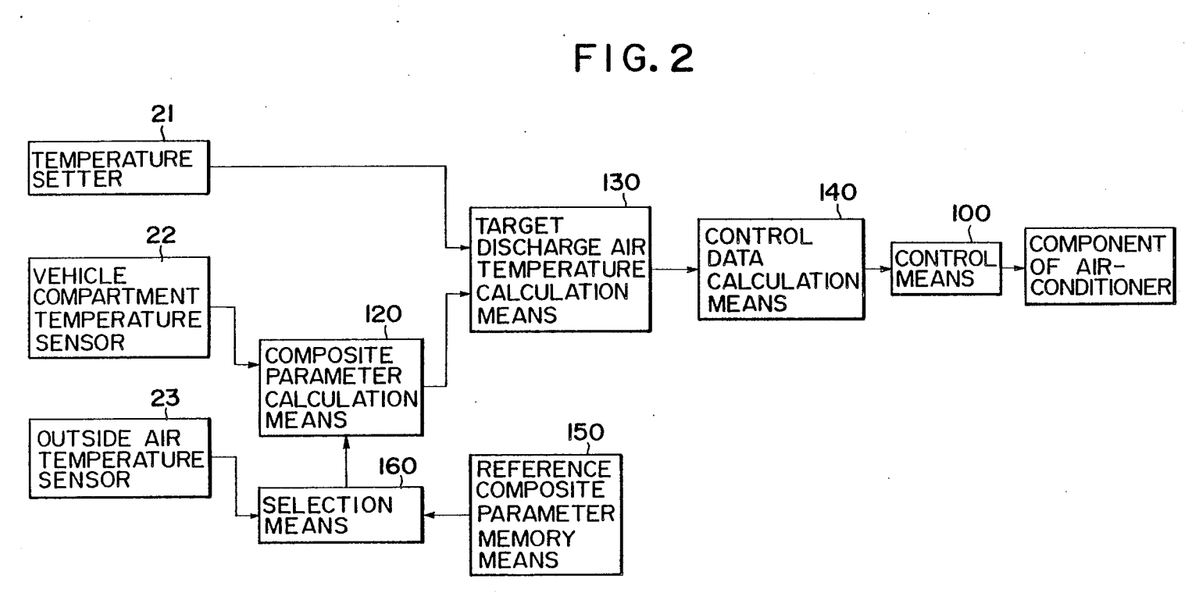
FIG. 2 is a block diagram showing the general construction of a control apparatus for an automobile air-conditioner according to a second embodiment of the present invention.

FIG. 2 shows a control apparatus for an automobile air-conditioner according to a second embodiment of the present invention. The control apparatus generally includes a temperature setter 21 for setting a temperature, a vehicle compartment temperature sensor 22 for detecting a temperature in a vehicle compartment, an outside air temperature sensor 23 for detecting a temperature of air outside the vehicle compartment, control means 100 for controlling operation of a component of the air-conditioner based on calculated control data, reference composite parameter memory means 150 for storing a plurality of sets of data each composed of composite parameters experimentally obtained with respect to one of a plurality of outside temperatures when the vehicle compartment temperature is varied while each outside temperature is kept constant, selection means 160 for selecting a set of data of the composite parameters from the reference composite parameter memory means 150 according to an output value from the outside air temperature sensor 23, composite parameter calculation means 120 for calculating a composite parameter corresponding to an output value from the vehicle compartment temperature sensor 22 by interpolating the thus-selected set of data of the composite parameters based on the output value from the vehicle compartment temperature sensor 22, target discharge air temperature calculation means 130 for calculating a desired temperature of discharge air based on a result of calculation by the composite parameter calculation means 120 and an output value of the temperature setter 21, and control data calculation means 140 for calculating control data for controlling the component of the air-conditioner, based on a result of calculation by the target discharge air calculation means 130.

Figure 3:
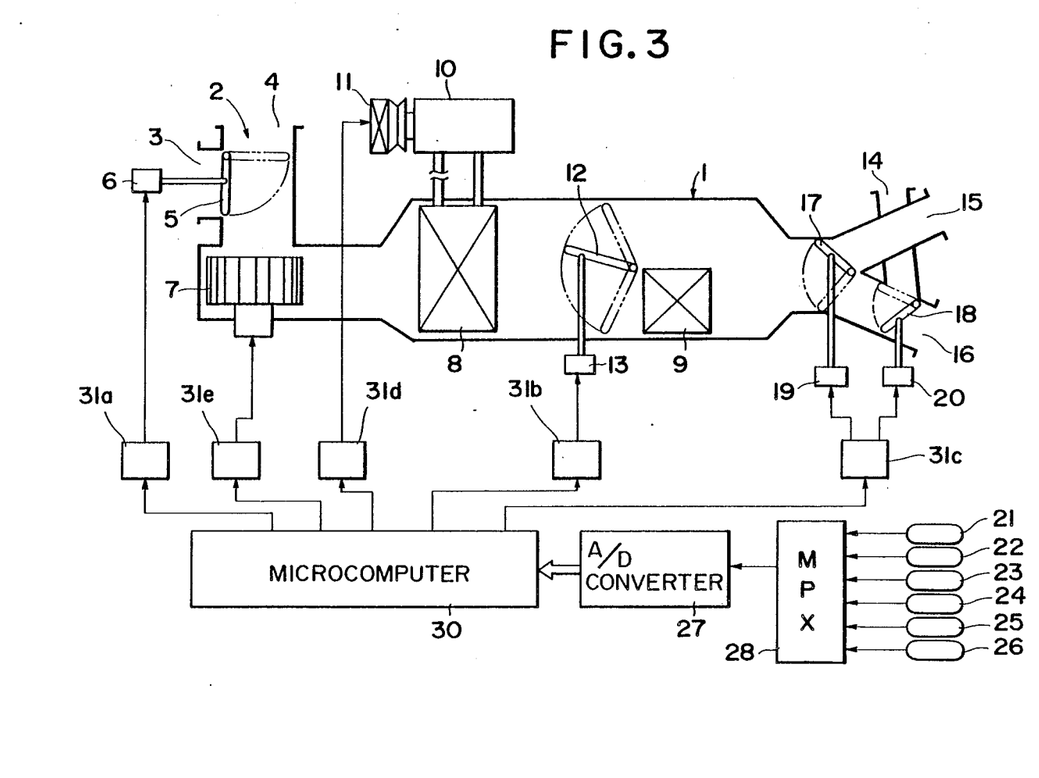
FIG. 3 is a diagrammatical view illustrative of the structural details of the automobile air-conditioner incorporating the control apparatus according to the present invention.

As shown in FIG. 3, the automobile air-conditioner incorporating the control apparatus includes an air-flow duct 1 having an intake door changeover device 2 at the upstream end thereof. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3, 4 for allowing the recirculated air or the outside air to be drawn into the duct 1.

A blower 7 is disposed in the duct 1 immediately downstream of the changeover device 2 to force the air to flow downstream through the duct 1. The duct 1 also includes the evaporator 8 and a heater core 9 disposed downstream of the blower 7 in the order named.

The evaporator 8 is connected in fluid circuit with a compressor 10 and non-illustrated components so as to constitute a refrigeration cycle or system. The compressor 10 includes an electromagnetic clutch 11 for selectively connecting the compressor 10 with an engine, not shown, of a motor vehicle. The electromagnetic clutch 11 is engaged and disengaged to undertake an on-off control of operation of the compressor 10. The heater core 9 serves to heat the air passing therearound by absorbing heat taken up from an engine cooling water recirculating through the heater core 9. An air-mix door 12 is disposed between the evaporator 8 and the heater core 9 and operatively connected to an actuator 13. The position of the air-mix door 12 is regulated by the actuator 13 for adjustably varying the ratio of the amount of air flowing directly through the heater core 9 to the amount of air bypassing the heater core 9, so that the temperature of air to be discharged or blown-off from the duct 1 is controlled at a desired value.

The duct 1 has at its downstream end a defroster outlet 14, a vent outlet 15 and a heat outlet 16 that are provided in branched fashion and all open to a vehicle compartment. A mode door 17 is disposed adjacent to the junction between the outlets 15, 16 while a mode door 18 is disposed adjacent to the junction between the outlets 14, 16 to open and close the respective outlets 14–16. The mode doors 17, 18 are drivably connected with a pair of actuators 19, 20 respectively, for selecting a desired discharge mode of the air-conditioner.

In addition to the above-mentioned temperature setter 21 for setting a temperature $T_D$ in the vehicle compartment and the above-mentioned sensors, i.e. the vehicle compartment temperature sensor 22 for detecting a temperature $T_R$ in the vehicle compartment and the outside air temperature sensor 23 for detecting a temperature $T_A$ of air outside the vehicle compartment, there are provided a position sensor 24 for detecting a position $X_P$ of the air-mix door 12, a mode sensor 25 disposed on or downstream of the evaporator 8 for detecting a temperature of the evaporator 8 or a temperature $T_E$ of air passing through the evaporator 8, and a sunlit portion temperature sensor 26 for detecting a temperature of a vehicle compartment portion exposed to the incident light of the sun (the radiant heat of the sun. Output signals from the temperature setter 21 and the respective sensors 22-26 are inputted through a multiplexer (MPX) 28 into an A/D converter 27 in the order selected by the multiplexer 28. After having been digitalized by the A/D converter 27, the output signals are supplied to a microcomputer 30.

The microcomputer 30 is of the conventional type known per se and comprises a central processing unit (CPU), a read only memory (ROM), a random access memory (RAM) and an input/output port (I/O), neither shown. The microcomputer 30 arithmetically processes the input signals stated above to produce control signals and then issues the control signals through respective driver circuits 31a–31e to the actuators 6, 13, 19, 20, the compressor 10 and a motor of the blower 7 for controlling the operation of the respective doors 5, 12, 17, 18, the on-off operation of the compressor 10 and the rotation of the blower motor.

Figure 4:
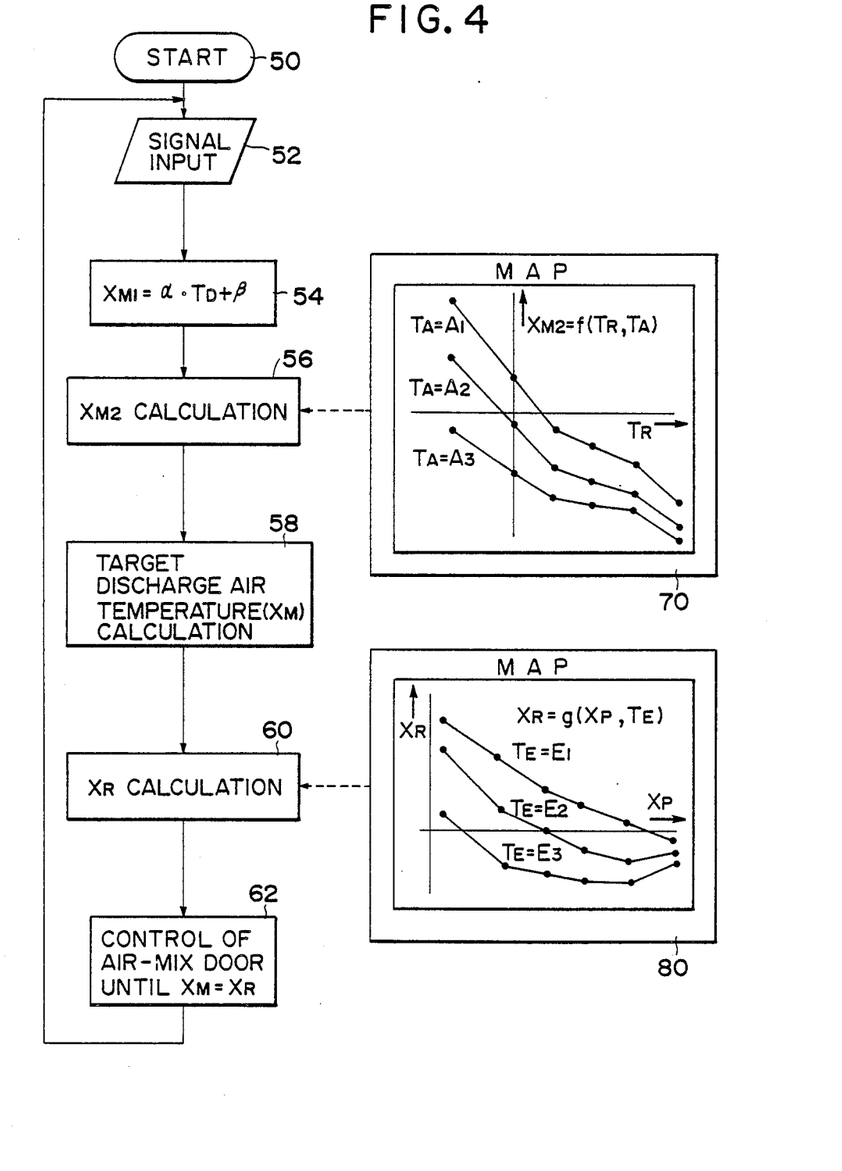
FIG. 4 is a flowchart showing a control routine achieved by a microcomputer in the control apparatus for controlling the position of an air-mix door of the air-conditioner.

The operation of the microcomputer 30 will be described below with reference to a flowchart shown in FIG. 4 in which a control routine for the control of the air-mix door 12 is illustrated.

The control routine of the microcomputer 30 starts in a step 50 in accordance with a program stored in the microcomputer 30. In the next step 52, various signals $T_D$, $T_R$, $T_A$, $X_P$, $T_E$, etc. are inputted from the temperature setter 21 and the respective sensors 22-16 into the microcomputer 30.

Thereafter, the control goes to a step 54 in which a correction parameter $X_{M1}$ is calculated based on the set temperature $T_D$ in accordance with the following equation (1).

$$X_{M1} = \alpha \cdot T_D + \beta \tag{1}$$

where $\alpha$ is a gain of the temperature setter 21 and $\beta$ is a correction term determined in view of the radiant heat of the sun.

In the next step 56, by using the vehicle compartment temperature $T_R$ and the outside air temperature $T_A$ as parameters, reference composite parameter $[X_{M2} = f(T_R, T_A)]$ is read out from predetermined map data stored in the ROM. A map 70 used in this embodiment is of a three-dimensional structure indicated by a system of coordinates in which a plurality of performance curves of $T_A$ are plotted with reference to $X_{M2}$ on Y-axis and $T_R$ on X-axis. The $X_{M2}$ values have been experimentally obtained based on a correlation between a plurality of representative values of $T_A$ and a plurality of representative values of $T_R$.

The representative values of $T_R$ and $T_A$ are preferably selected such that a drastic and non-linear change in $X_{M2}$ values takes place at each of the predetermined values.

Figure 5:
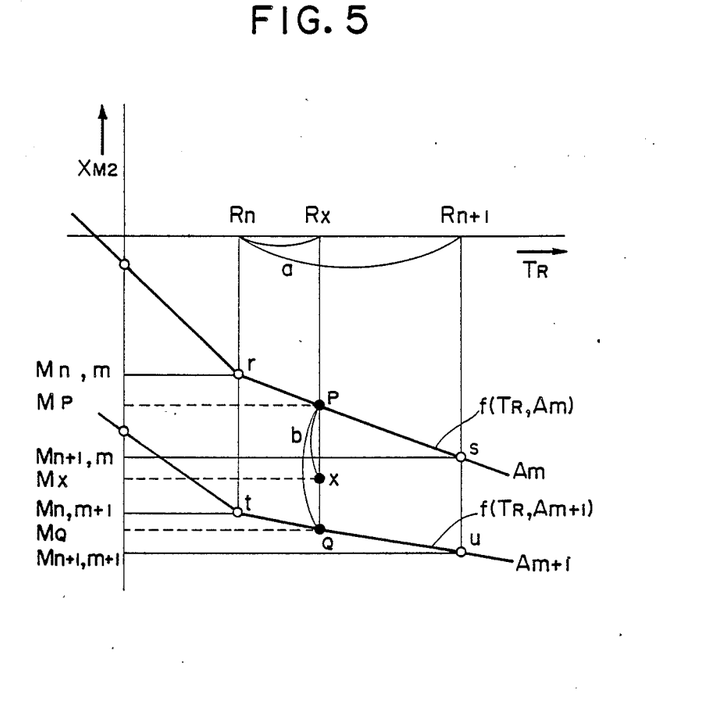
FIG. 5 is an enlarged graphic representation of a control map shown in FIG. 4.

The map 70 is used for the determination of an $X_{M2}$ value (Mx) which is corresponding to a present vehicle compartment temperature $T_R$ (represented by Rx) and a present outside air temperature $T_A$ (represented by Ax) inputted respectively from the vehicle compartment temperature sensor 22 and the outside air temperature sensor 23, in a manner described below. As shown in FIG. 5, two representative points Rn and Rn+1 adjacent to Rx are selected from X-axis where Rn<Rx<Rx+1, then an internal ratio (a) of $T_R$ is obtained according to the following equation (2).

$$a = \frac{Rx - Rn}{Rn + 1 - Rn} \tag{2}$$

Likewise, two representative curves Am, Am+1 adjacent to Ax are selected from performance curves of $T_A$ where Am<Ax<Am+1, then an internal ratio (b) of $T_A$ is calculated by the following equation (3).

$$b = \frac{Ax - Am}{Am + 1 - Am} \quad (3)$$

Then, from the above-mentioned values of Rn, Rn+1, Am and Am+1, four points (r, s, t, u) are plotted from which corresponding four points Mn,m, Mn+1,m, Mn,m+1 and Mn+1,m+1 are plotted on Y-axis indicative of $X_{M2}$. Each of the difference between the Mn, m value and the Mn+1, m and the difference between the Mn, m+1 value and the Mn+1,m+1 value is multiplied by the internal ratio (a), then interpolated in accordance with the following equations (4), thus obtaining a value (M$_P$) of $X_{M2}$ corresponding to the point P on the Am curve plotted from Rx and a value (M$_Q$) of $X_{M2}$ corresponding to the point Q on the Am+1 curve plotted from Rn+1.

$$M_P = -\{(Mn,m - Mn+1,m)a + Mn,m\}$$

$$M_Q = -\{(Mn,m+1 - Mn+1, m+1)a + Mn,m+1\} \quad (4)$$

Thereafter, the difference between M$_P$ and M$_Q$ is multiplied by the internal ratio (b) and then interpolated in accordance with the following equation (5), thus obtaining a value (Mx) of the composite parameter $M_{X2}$.

$$Mx = -\{(M_P - M_Q)b + M_P\} \quad (5)$$

In the map 70, pieces of data on $T_A$ between two adjacent plotted pints are determined by approximation as indicated by a straight solid line in FIG. 5. However, since each individual plot on the map is experimentally determined, a $X_{M2}$ value calculated based on the map is nearly equal to the experimentally obtained value. Furthermore, with the use of interpolation, the number of sets of map data is considerably small as opposed to a control system which requires storage of $X_{M2}$ values corresponding to all of the possible values of $T_R$ and $T_A$. Consequently, an accurate processing can be achieved with the use of a small memory capacity.

After the composite parameter $X_{M2}$ is obtained as stated above, the control proceeds to a step 58 in which a desired or target discharge air temperature ($X_M$) is calculated based on the correction parameter $X_{M1}$ obtained in the step 54 and the composite parameter $X_{M2}$ obtained in the step 56, in accordance with the following equation (6).

$$X_M = X_{M1} + X_{M2} \quad (6)$$

Thereafter, the air-mix door 12 is controlled in a step 60 et seq. until the temperature $X_R$ of air being discharged from any of the outlets 14–16, i.e. the actual discharged air temperature $X_R$ becomes equal to the thus-calculated target temperature $X_M$.

The actual discharged air temperature $X_R$ may be obtained by a measurement of the temperature of air discharged from the outlet. In the illustrated embodiment, values for $X_R$ are determined based on a correlation between plurality of representative positions $X_P$ of the air-mix door 12 and corresponding output values $T_E$ from the mode sensor 25. The $X_R$ values thus determined are previously stored in ROM in the form of a map 80 of performance curves indicated by a functional equation $X_R = g(X_P, T_E)$. The map 80 is used in the step 60 in which an $X_R$ value corresponding to the given values of $X_P$ and $T_E$ is obtained from the map 80 in the same manner as done when the $X_{M2}$ value is obtained.

In the next step 62, a control amount for the air-mix door 12 which is necessary to equalize $X_R$ and $X_M$ is calculated, then a corresponding control signal is issued to the drive circuit 31b for moving the air-mix door 12. Thereafter, the control returns to the step 52.

Figure 6:
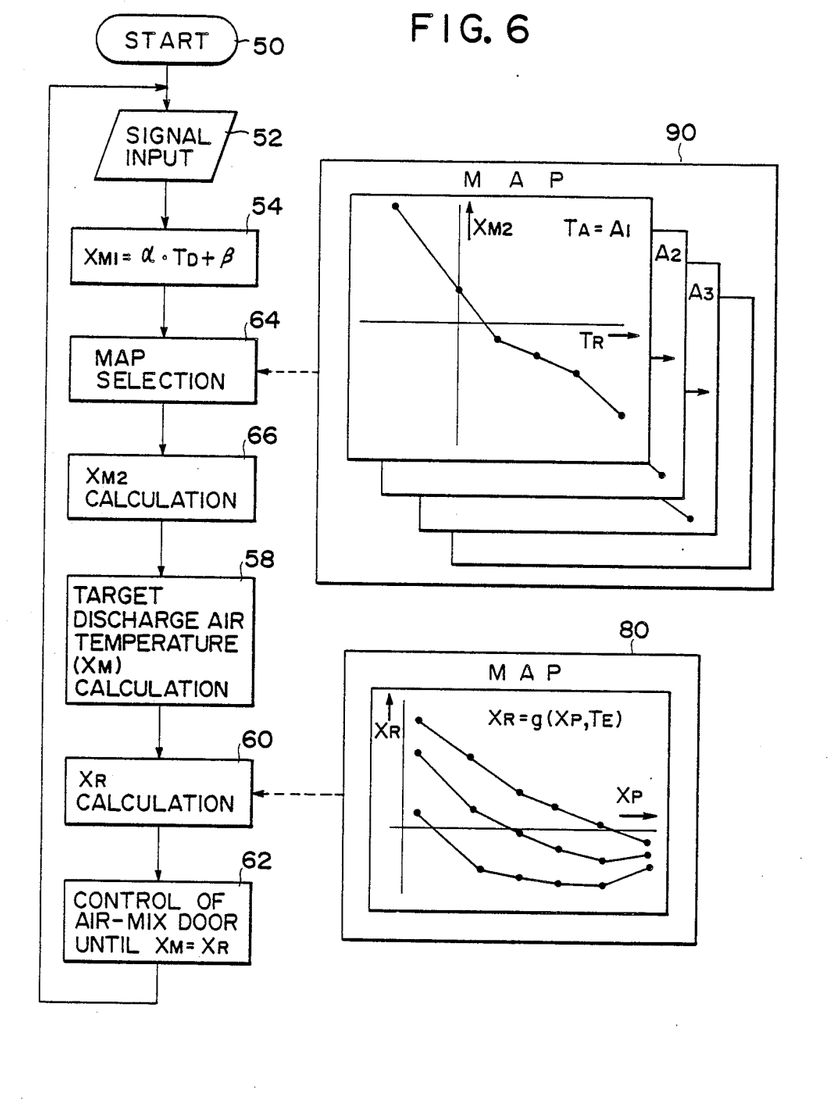
FIG. 6 is a flowchart showing another control routine achieved by the microcomputer for the control of the position of the air-mix door.

FIG. 6 is a flowchart showing a control routine achieved in the microcomputer in the control apparatus according to the second embodiment shown in FIG. 2. In this embodiment, a composite parameter $X_{M2}$ is obtained from a series of maps 90 previously stored in ROM.

The maps 90 used in the embodiment comprise a set of maps each prepared with respect to one of a plurality of TA values (A1, A2, A3 . . . ). Each map has a two-dimensional structure indicated by a system of coordinates in which a correlation between the composite parameter $X_{M2}$ and the positions $X_P$ of the air-mix door 12 is plotted with respect to a certain outside air temperature $T_A$. The $X_{M2}$ values drawn on Y-axis on the coordinates have been experimentally determined with respect to a plurality of representative values of $T_R$ drawn on X-axis of the same coordinates.

After $X_1$ is determined in a step 54, the maps 90 are sorted in a step 64 to choose one map of an outside air temperature which is closest to the outside air temperature detected by the outside air temperature sensor 23. Then, two adjacent sets of map data which are adjacent to the detected vehicle compartment temperature $T_R$ are read out and they are interpolated in the same manner as done with the foregoing equations (2) and (4), thereby calculating a composite parameter $X_{M2}$ in a step 66. Thereafter, the control proceeds to a step 58 et seq. in the same manner as done with the first embodiment described above.

According to the second embodiment, an interpolation is possible when $X_{M2}$ is determined based on $T_R$. However, because of stepwise selection of the maps 90, a relatively large number of maps prepared with respect to a closely separated $T_A$ values are necessary so as to provide an accurate processing. Consequently, this control system requires a large memory capacity but effectively operate in the same manner as the control system of the first embodiment.

Those steps which correspond to the steps described with reference to the first embodiment are designated by the corresponding reference characters and a detailed description thereof is not necessary.

In both of the illustrated embodiments, the target discharge air temperature is used for the production of control data necessary for controlling the air-mix door 12. The target discharge air temperature may be used for the formation of control data necessary for controlling any one of the selecting door 5, blower 7, compressor 10 and mode doors 17, 18.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling an automobile air-conditioner, comprising:
   (a) a temperature setter for setting a temperature;
   (b) a vehicle compartment temperature sensor for detecting a temperature in a vehicle compartment;

(c) an outside air temperature sensor for detecting a temperature of air outside the vehicle compartment;
(d) control means for controlling operation of a component of the air-conditioner based on calculated control data;
(e) reference composite parameter memory means for storing composite parameters experimentally obtained with respect to a plurality of representative vehicle compartment temperatures and a plurality of representative outside air temperatures;
(f) composite parameter calculation means for calculating composite parameters corresponding to output values from said vehicle compartment temperature sensor and said outside air temperature sensor by interpolating the composite parameters stored in said reference composite parameter memory means based on the output values from said sensors;
(g) target discharge air temperature calculation means for calculating a desired temperature of discharge air based on a result of calculation by said composite parameter calculation means and an output value from said temperature setter; and
(h) control data calculation means for calculating control data for controlling the component of the air-conditioner, based on a result of calculation by said target discharge air calculation means.

2. An apparatus for controlling an automobile air-conditioner, comprising:
(a) a temperature setter for setting a temperature;
(b) a vehicle compartment temperature sensor for detecting a temperature in a vehicle compartment;
(c) an outside air temperature sensor for detecting a temperature of air outside the vehicle compartment;
(d) control means for controlling operation of a component of the air-conditioner based on calculated control data;
(e) reference composite parameter memory means for storing a plurality of sets of data each composed of composite parameters experimentally obtained with respect to one of a plurality of outside temperatures when the vehicle compartment temperature is varied while each outside temperature is kept constant;
(f) selection means for selecting a set of data of the composite parameters from said reference composite parameter memory means according to an output value from said outside air temperature sensor;
(g) composite parameter calculation means for calculating a composite parameter corresponding to an output value from said vehicle compartment temperature sensor by interpolating the thus-selected set of data of the composite parameters based on the output value from said vehicle compartment temperature sensor;
(h) target discharge air temperature calculation means for calculating a desired temperature of discharge air based on a result of calculation by said composite parameter calculation means and an output value of said temperature setter; and
(i) control data calculation means for calculating control data for controlling the component of the air-conditioner, based on a result of calculation by said target discharge air calculation means.

* * * * *